United States Patent Office 2,739,921
Patented Mar. 27, 1956

2,739,921

BRONCHODILATOR COMPOSITION OF BETA-(ORTHOMETHOXY PHENYL)-ISOPROPYL-METHYLAMINE WITH THEOPHYLLINE

Marshall E. Bennett, Kalamazoo, Mich., assignor to The Upjohn Company, Kalamazoo, Mich., a corporation of Michigan No Drawing. Application November 21, 1951,
Serial No. 257,663

7 Claims. (Cl. 167—65)

This invention relates to theophylline salts of organic amines, and in particular to the water-soluble theophylline salt of methoxyphenamine, methoxyphenamine being also known by the chemical name of beta-(orthomethoxyphenyl)-isopropyl methylamine.

An object of the present invention is to provide a water-soluble theophylline salt of a therapeutically active, water-insoluble organic amine. It is a further object of the present invention to provide a theophylline salt of beta-(orthomethoxyphenyl)-isopropyl methylamine. A further object is to provide a concentrated aqueous solution of theophylline and beta-(orthomethoxyphenyl)-isopropyl methylamine. An additional object is to provide a convenient method for the preparation of the theophylline salt of beta-(orthomethoxyphenyl)-isopropyl methylamine. Other objects will become apparent hereinafter.

The objects of the present invention are accomplished preferably by mixing approximately two parts of theophylline, 1.0 parts of methoxyphenamine, beta-(orthomethoxyphenyl)-isopropyl methylamine, and three parts of water at about forty degrees centigrade until a clear solution is formed. The proportions indicated are for hydrous theophylline. The anhydrous theophylline, in equivalent amounts, may be similarly used in preparing either the compound or mixtures. The order of mixing is not important. While elevated temperatures are especially suitable for the preparation of a concentrated beta-(orthomethoxyphenyl)-isopropyl methylamine-theophylline product, lower temperatures are utilizable in the preparation of less concentrated solutions. The theophylline-beta-(orthomethoxyphenyl)-isopropyl methylamine salt thus formed is isolated as a non-hydroscopic, free-flowing, crystalline solid by merely evaporating the water. The structural formula of beta-(orthomethoxyphenyl)-isopropyl methylamine-theophyllinate is represented as follows:

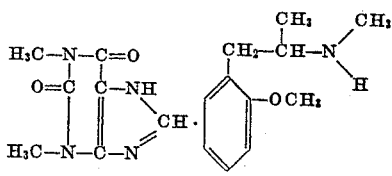

The theophylline-beta-(orthomethoxyphenyl)-isopropyl methylamine salt and aqueous solutions thereof are of value in the preparation of convenient dosage forms of theophylline and beta-(orthomethoxyphenyl)-isopropyl methylamine as an improved bronchodilator. The improved bronchodilator properties are unexpected for there is no reason to suppose that the particular salt used to procure the solubility of theophylline would have any material influence on the action of theophylline. While the theophylline - beta - (orthomethoxyphenyl) - isopropyl methylamine salt is a precisely proportioned highly water-soluble form of the separately relatively insoluble theophylline and beta-(orthomethoxyphenyl)-isopropyl methylamine, some of the advantages of the salt may be achieved by a mixture of theophylline in free or salt form, as for example aminophylline, and the free base beta-(orthomethoxyphenyl)-isopropyl methylamine or methoxyphenamine salt, as for example methoxyphenamine hydrochloride, in equimolecular or other proportions in solid form or in a vehicle, illustratively oil. It is to be noted that each ingredient in the mixture increases the solubility of the other ingredient as exhibited in aqueous solutions at room temperature. In the presence of water, either added or in the body, the combination has increased water-solubility and enhanced therapeutic efficacy. In either the compound or the composition, in the wet or dry condition, preservatives and aromatics may be added. Preparations may be made in tablet, capsule, suppository, ampoule or other convenient forms.

The following example is given to illustrate the preferred mode of the invention and is not to be construed as limiting.

*Example.—Beta-(orthomethoxyphenyl)-isopropyl methylamine-theophyllinate*

To 198.1 grams of theophylline suspended in 300 milliliters of water was added 189.1 grams of methoxyphenamine, beta-(orthomethoxyphenyl)-isopropyl methylamine. The resulting mixture was stirred and heated to between about forty and fifty degrees centigrade for a few minutes whereupon a clear, viscous solution formed. Upon cooling to room temperature the solution remained clear. However, upon removal of about one-half of the water, a copious, crystalline precipitate of the theophylline salt of methoxyphenamine formed and was filtered off and dried on a piece of porous plate. Upon further concentration of the filtrate, a second crop of crystals was obtained and this was also dried on a porous plate. The two crops were then combined and washed with petroleum ether to obtain 329.2 grams of beta-(orthomethoxyphenyl)-isopropyl methylamine-theophyllinate as a non-hydroscopic, free-flowing powder which melted at 271 degrees centigrade on a Koffler "hot bench."

The advantageous solubility of beta-(orthomethoxyphenyl)-isopropyl methylamine-theophyllinate is indicated in the following table:

*Solubility in water at twenty degrees centigrade*

|  | Percent |
|---|---|
| Beta-(orthomethoxyphenyl)-isopropyl methylamine (free base) | insoluble |
| Theophylline | 0.83 |
| Beta-(orthomethoxyphenyl)-isopropyl methylamine, theophylline mixture (equimolar) | 55 to 60 |
| Beta-(orthomethoxyphenyl)-isopropyl methylamine-theophyllinate | 55 to 60 |

It is to be understood that the invention is not to be limited to the exact details of operation shown as obvious modifications and equivalents will be apparent to one skilled in the art, and the invention is therefore to be limited only by the scope of the appended claims.

Having described my invention, I claim:

1. A bronchodilator composition comprising beta-(orthomethoxyphenyl)-isopropyl methylamine and theophylline.

2. Beta-(orthomethoxyphenyl)-isopropyl methylamine-theophyllinate.

3. A dry bronchodilator mixture of theophylline and the hydrochloride of beta-(orthomethoxyphenyl)-isopropyl methylamine.

4. A bronchodilator water solution of theophylline and beta-(orthomethoxyphenyl)-isopropyl methylamine.

5. An aqueous bronchodilator solution of beta-(orthomethoxyphenyl)-isopropyl methylamine-theophyllinate.

6. An aqueous bronchodilator solution of theophylline and beta-(orthomethoxyphenyl)-isopropyl methylamine containing theophylline in a concentration in excess of that which the solution would hold in the presence of theophylline alone.

7. An aqueous bronchodilator solution of theophylline and beta-(orthomethoxyphenyl)-isopropyl methylamine containing methoxyphenamine in a concentration in excess of that which the solution would hold in the presence of beta-(orthomethoxyphenyl)-isopropyl methylamine alone.

References Cited in the file of this patent

UNITED STATES PATENTS

| | | |
|---|---|---|
| 2,205,530 | Hildebrandt | June 25, 1940 |
| 2,309,151 | Woodruff | Jan. 26, 1943 |

FOREIGN PATENTS

| | | |
|---|---|---|
| 691,339 | Germany | May 23, 1940 |

OTHER REFERENCES

Marquardt et al.: Pharmazie, vol. I (1946), pp. 59–60.